UNITED STATES PATENT OFFICE.

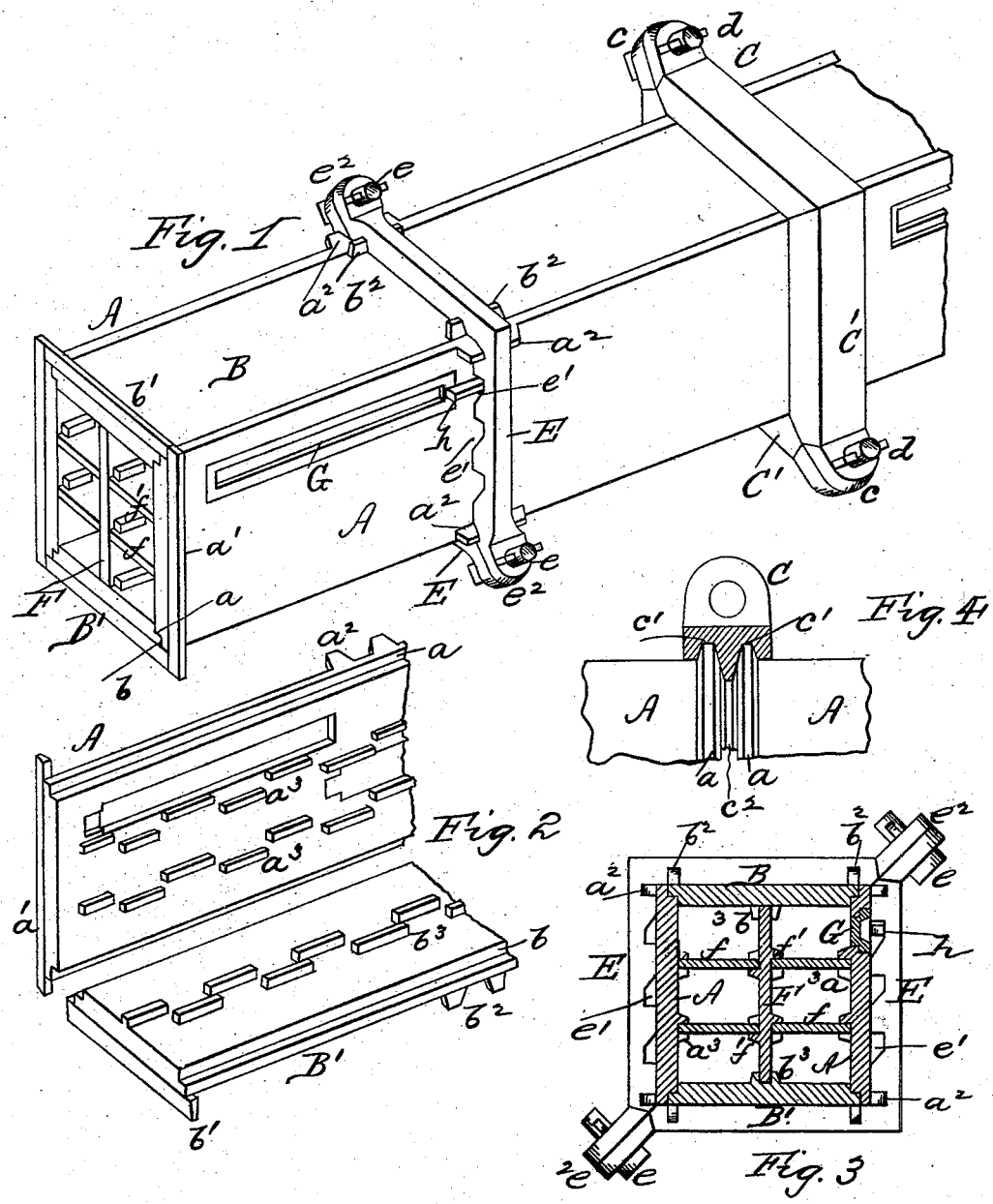

JOHN K. McLAUGHLIN, OF PHILADELPHIA, PENNSYLVANIA, ASSIGNOR OF ONE-HALF TO LEWIS H. TAYLOR, JR., OF SAME PLACE.

CONDUIT FOR ELECTRICAL CONDUCTORS.

SPECIFICATION forming part of Letters Patent No. 269,085, dated December 12, 1882.

Application filed January 27, 1882. (No model.)

*To all whom it may concern:*

Be it known that I, JOHN K. McLAUGHLIN, a citizen of the United States, residing at Philadelphia, in the county of Philadelphia and State of Pennsylvania, have invented certain new and useful Improvements in Conduits for Electrical Conductors; and I do hereby declare the following to be a full, clear, and exact description of the invention, reference being had to the accompanying drawings, which form part of this specification, in which—

Figure 1 is a perspective of a conduit embodying my improvements. Fig. 2 is a perspective representing detail parts of the same. Fig. 3 is a transverse vertical section, and Fig. 4 is a broken elevation, of two adjoining conduit-sections with clamping-collar, the latter being in section.

My invention has relation to conduits for electrical conductors; and my improvements have for their object to provide a conduit which can be cheaply manufactured, compactly stored or packed for transportation, and readily put together, forming, when laid, a perfectly tight and durable integument for cables or wires contained therein.

My improvements consist in the peculiar construction and combination of parts hereinafter set forth and specifically claimed, having reference principally to forming the conduit-sections of four flat sides or plates fastened together to form a rectangular pipe or tube, such sections being coupled end to end, and clamped between such ends to render the joints perfectly tight; also, to constructing the conductor-supporters of vertical partitions with detachable shelves.

Referring to Fig. 1 of the accompanying drawings, which illustrates a conduit embodying my invention, A A and B B' represent the two sides and the top and bottom plates, which compose a conduit-section. Said plates are designed to be made of cast metal, though any other suitable material—such as glass, terra-cotta, or artificial stone—may be substituted therefor. Said plates are formed with rabbeted edges $a\,b$, and are designed and adapted to be fitted together to form rectangular pipes, tubes, or conduits, as shown in said figure. To hold the plates securely together they are formed with transverse ribs $a'\,b'$ at either end, and between such ends have external projecting lugs, $a^2\,b^2$, in double rank, parallel with the ribs.

C C are clamp-collars for the ends of the sections, each such collar being composed of two L-shaped castings, C' C', having beveled ends $c\,c$, which face each other, as shown, and are formed with openings for the passage of the fastening-bolts $d\,d$. The collars have double internal grooves, $c'\,c'$, into which fit the end ribs, $a\,b$, of the plates A B B' and a rib, $c^2$, which fits between the ends of the sections composed of such plates. E E represent other clamping-collars, which embrace the sections between their ends, fitting between the lugs $a^2\,b^2$, as shown. These collars E E are also L-shaped castings with beveled ends $e^2\,e^2$ and fastening-bolts $e\,e$. By means of the end collars, C C, and intermediate collars, E E, the plates A B B' are held firmly together, their joints being rendered tight against the intrusion of moisture.

The conduit may, if desired, be divided longitudinally into separate compartments by means of vertical partitions F with lateral shelves $f$, on which the conductors or cables are to be laid. The partitions and shelves are made separate and in the form of flat plates. The former are made with parallel lugs $f'$ to receive the inner edges of the shelves $f$, and to sustain the outer edges of said shelves the sides A are formed with similar internal lugs, $a^3$. The top and bottom plates, B B', of the conduits have similar lugs, $b^3$, to receive the upper and lower edges of the partitions F. To permit access to such conductors the side plates, A, may be formed with detachable gates or shutters G, which are held in place by causing one of their ends to pass into a rabbet in the plate, the other end being secured by wedges $h$, which pass into notches or openings $e'$ in the median collars, E. There may, if desired, be one shutter for each compartment, so as to secure ready access to the conduits without exposing other compartments; or a single shutter may be made large enough to uncover all the compartments on one side of a conduit. The plates and collars may be formed of cast metal and will require no finishing. The plates may be packed for transportation much more compactly than complete tubular conduits, with a corresponding saving in freight. They can readily and speedily be put together by unskilled labor, and when properly laid will form a perfectly secure conduit and protector for electrical conductors. When access to the contents is required the shutters may be taken off, or the collars may be unloosened, and one or more of the plates forming the sections removed.

In another application, of even date herewith, I have shown and claimed the end collars, C. Hence I do not in this application broadly claim the same. In such other application I have also shown a partition and shelves formed in one piece; but in the present case they are composed of separate flat plates, a different construction, to which my claims are restricted.

What I claim as my invention is as follows:

1. The combination, with plates A B B', having lugs $a^2$ $b^2$ between their ends, of clamping-collars E, fitting between said lugs, substantially as shown and described.

2. The combination, with conduit-sections having detachable shutters or gates, of clamping-collars E, and wedges $h$, fitting in openings in said collars and fastening said shutters, substantially as set forth.

3. The combination, with conduit-sections composed of plates A B, having internal lugs or ribs, $a^3$ $b^3$, said sections being open-ended and said partitions and shelves being constructed as described, whereby they may be inserted through such open ends, of vertical partitions F, and shelves fitting between and supported by such lugs or ribs, substantially as shown and described.

In testimony that I claim the foregoing I have hereunto set my hand this 24th day of January, 1882.

JOHN K. McLAUGHLIN.

Witnesses:
 CHAS. F. VAN HORN,
 M. D. CONNOLLY.